United States Patent
Mattox et al.

(10) Patent No.: US 10,676,227 B1
(45) Date of Patent: Jun. 9, 2020

(54) BULK BAG CLOSING SYSTEM

(71) Applicant: Schenck Process LLC, Kansas City, MO (US)

(72) Inventors: Daniel J. Mattox, Kansas City, MO (US); Blake Meyer, Kansas City, MO (US); Adam Johnson, Kansas City, MO (US); Derek Brethouwer, Olathe, KS (US)

(73) Assignee: Schenck Process LLC, Kansas City, MO (US)

( * ) Notice: Subject to any disclaimer, the term of this patent is extended or adjusted under 35 U.S.C. 154(b) by 0 days.

(21) Appl. No.: 16/427,000

(22) Filed: May 30, 2019

(51) Int. Cl.
*B65B 69/00* (2006.01)

(52) U.S. Cl.
CPC ............................... *B65B 69/0083* (2013.01)

(58) Field of Classification Search
CPC .......................... B65D 23/003; B65D 51/242
See application file for complete search history.

(56) References Cited

U.S. PATENT DOCUMENTS

| | | | |
|---|---|---|---|
| 3,058,483 A | 10/1962 | Douglass et al. | |
| 4,705,518 A * | 11/1987 | Baker | A61F 2/0036 128/899 |
| 5,918,447 A * | 7/1999 | Hanten | A22C 11/105 53/551 |
| 6,892,510 B2 * | 5/2005 | Sterner | B65B 51/00 53/138.3 |
| 7,032,875 B2 | 4/2006 | Sterner et al. | |
| 8,807,517 B2 * | 8/2014 | Townsend | F16K 7/065 251/251 |
| 2010/0127194 A1 | 5/2010 | Landry | |

FOREIGN PATENT DOCUMENTS

| | | |
|---|---|---|
| DE | 1032990 | 6/1958 |
| WO | 01/81177 A1 | 11/2001 |

\* cited by examiner

*Primary Examiner* — Donnell A Long
(74) *Attorney, Agent, or Firm* — Hovey Williams LLP

(57) ABSTRACT

A closing system for a bag. The closing system comprises a first plate and a second plate. The closing system further comprises a plurality of constriction rods extending between the first plate and the second plate. The constriction rods present a constriction area configured to receive a portion of the bag. Each of the first plate and the second plate is configured to rotate. Rotation of the plates is configured to shift the constriction rods so as to reduce a size of the constriction area.

20 Claims, 13 Drawing Sheets

BULK BAG CLOSING SYSTEM

BACKGROUND OF THE INVENTION

1. Field of the Invention

Embodiments of the present invention relate generally to a bulk bag closing system. In more detail, embodiments of the present invention are directed to a bag closing system for restricting the flow of product from a bulk bag during product handling and processing operations.

2. Description of the Related Art

Certain product handling and processing systems receive product via bags, such as bulk bags. These bulk bags are generally configured as large, flexible containers, which may be formed from fabric, such as thick woven polyethylene or polypropylene. Bulk bags can be used to carry various types of dry, flowable product, such as powders, granules, pellets, or the like. In some cases, the bulk bags may be sized to carry as much as one ton or more of product.

To receive the product from the bulk bags, material product and processing systems generally include product discharge devices to which the bulk bags can be attached. Once a bulk bag is secured to such a product discharge device, the product within the bulk bag can be removed from the bulk bag and can flow into the product handling and processing system. Generally, such flow of product is facilitated by gravity. The bulk bag will be held above the product discharge device, and the product can flow down and out of the bag (e.g., via a bag spout) under the force of gravity. Unfortunately, because bulk bags can be filled with a significant amount of product, the bulk bags can be quite heavy (e.g., one or more tons), which can make the bulk bags difficult to close and/or can make it difficult to restrict the flow of product from the bag.

Some previously used product material and handling systems were known to include pinch valves or iris valves to restrict flow of product from bags. However, such previously used systems were generally large and cumbersome. In addition, such previously used systems were known to provide an inadequate closing force, such that the systems would often be incapable of suitably restricting the flow of product from bags.

SUMMARY OF THE INVENTION

Some embodiments of the present invention include a closing system for a bag. The closing system comprises a first plate and a second plate. The closing system further comprises a plurality of constriction rods extending between the first plate and the second plate. The constriction rods enclose a constriction area configured to receive a portion of the bag. Each of the first plate and the second plate is configured to independently rotate. Rotation of the plates is configured to shift the constriction rods so as to reduce a size of the constriction area.

Other embodiments of the present invention include a closing system for a bag. The closing system comprises a plate assembly including at least two rotatable plates. The plate assembly presents a central aperture. The closing system additionally comprises a plurality of constriction rods extending between portions of the plate assembly and across a portion of the central aperture. The constriction rods present a constriction area configured to receive part of the bag. Actuation of the plate assembly is configured to shift the constriction rods so as to reduce a size of the constriction area.

Some additional embodiments of the present invention include a method of restricting product flow from a bag. The method comprises a step of positioning part of the bag through a closing system. The closing system comprises a first rotatable plate, a second rotatable plate, and a plurality of constriction rods extending between portions of the plates. The constriction rods present a constriction area configured to receive the part of the bag. An additional step of the method includes rotating the first plate in a first direction. A further step of the method includes rotating the second plate in a second direction. During the rotating steps, the constriction rods are shifted to reduce a size of the constriction area around the part of the bag so as to restrict product flow from the bag.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE FIGURES

Embodiments of the present invention are described in detail below with reference to the attached drawing figures, wherein.

Figure 1:
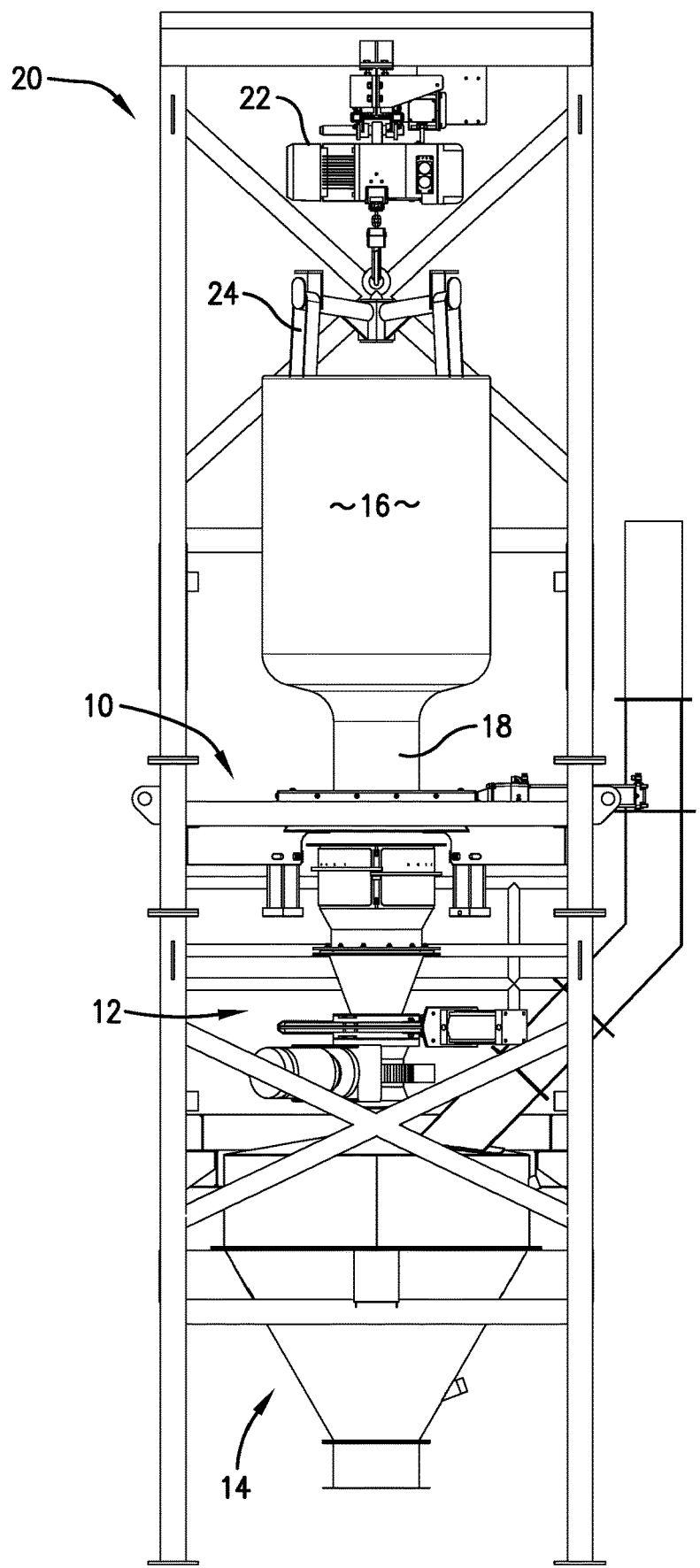
FIG. 1 is a front elevation view of a lifting assembly positioning a portion of a bulk bag through a bulk bag closing system and into association with a product handling and processing system.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

With reference to FIG. 1, embodiments of the present invention are directed to a bulk bag closing system 10. In some embodiment, the bulk bag closing system 10 will be configured for use with a product discharge assembly 12 operably associated with a product handling and processing system 14. When a bulk bag 16 is connected to the product discharge assembly 12, product from within the bulk bag can flow through the product discharge assembly 12 and down into the material handling a processing system 14. As was noted previously, however, the bulk bag 16 can contain a significant amount of product and can be quite heavy (e.g., one ton or more). As such, it can be difficult to restrict or stop the flow of product from the bulk bag 16, particularly once the bulk bag has been secured the product discharge assembly 12 and has been opened to begin product flow.

Figure 2:
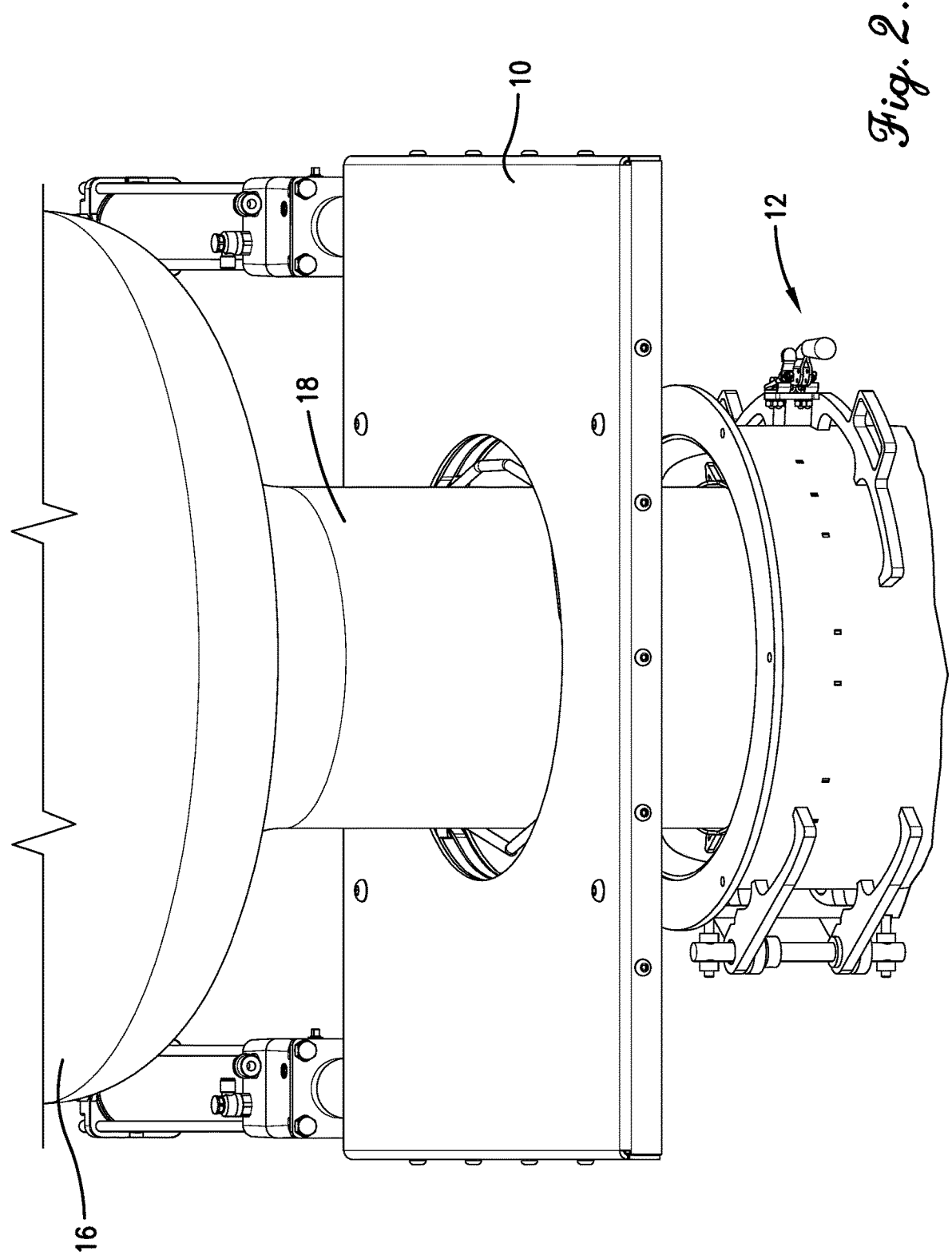
FIG. 2 is a front perspective view of the portion of the bulk bag extending through the bulk bag closing system from FIG. 1, and with the bulk bag closing system being in an open configuration so as to permit product to flow from the bulk bag and into the product handling and processing system.
Figure 3:
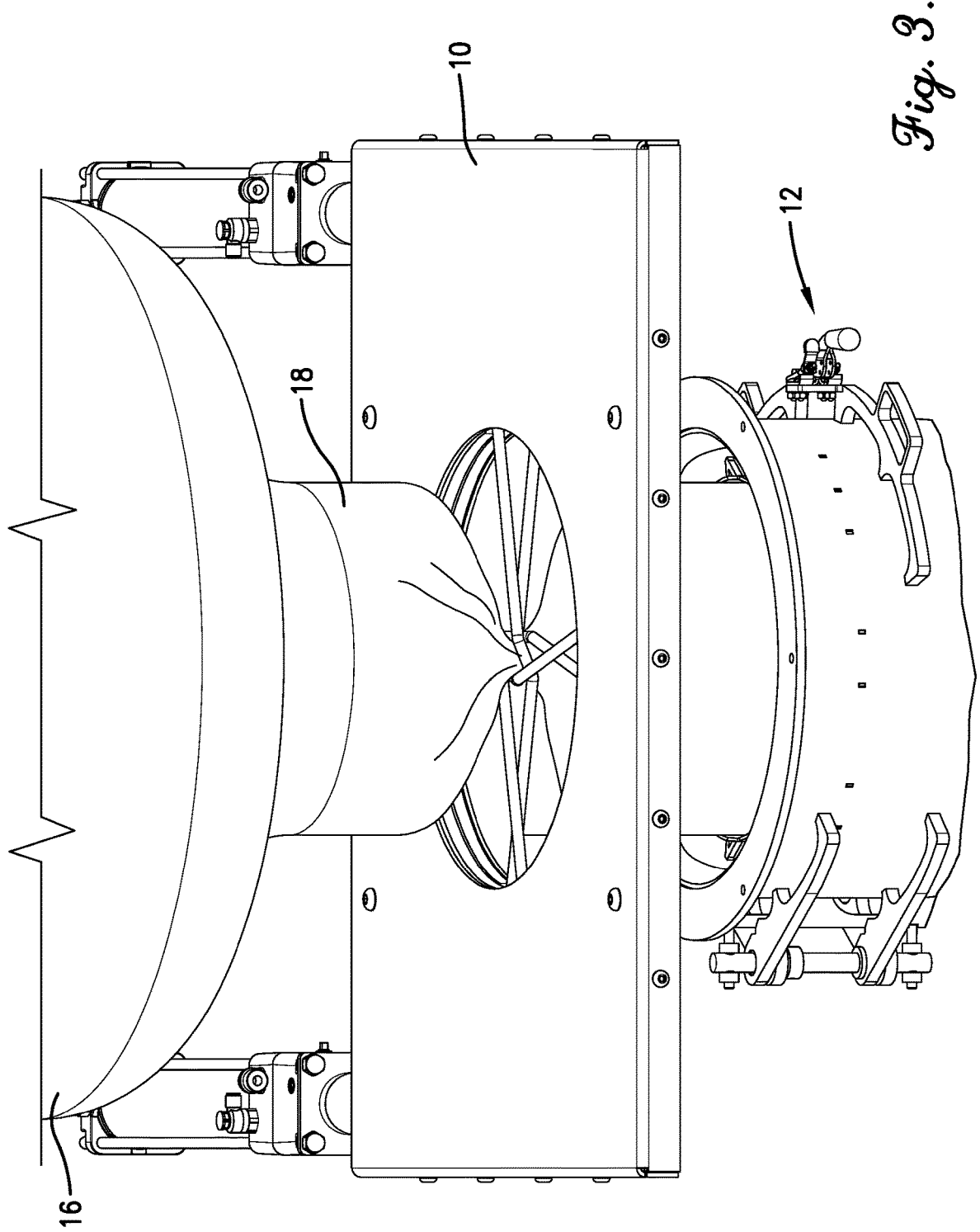
FIG. 3 is a front perspective view of the portion of the bulk bag extending through the bulk bag closing system from FIG. 1, and with the bulk bag closing system being in a closed configuration so as to restrict product from flowing out of the bulk bag.

Beneficially, the bulk bag closing system 10 of embodiments of the present invention is configured to efficiently restrict or completely prevent the flow of product from the bulk bag 16 on demand. As shown in FIGS. 2 and 3, the bulk bag closing system 10 may include a central aperture (discussed in more detail below) through which a portion of the bulk bag 16 may extend. For instance, as illustrated in FIG. 1, the bulk bag closing system 10 may be positioned above the product discharge assembly 12, such that a bag spout 18 of the bulk bag 16 can extend through the central aperture of the bulk bag closing system 10 as the bag spout 18 is secured to the product discharge assembly 12. In such a configuration, the bulk bag closing system 10 is configured, as discussed in more detail below, to constrict the bag spout 18 of the bulk bag 16 so as to restrict and/or completely prevent product from flowing from the bulk bag 16.

Remaining with FIG. 1, a bulk bag unloader frame 20 may include a bag lifting assembly, which includes a lifting hoist 22 and a bag attachment hanger 24. The bag lifting assembly is configured to lift and maneuver the bulk bag 16 into position with respect to the product discharge assembly 12. As such, the bulk bag 16 can be maneuvered in position, such that the bag spout 18 of the bulk bag 16 can be positioned through central aperture of the bulk bag closing system 10 and into engagement with the product discharge assembly 12 so as to facilitate removal of product from the bulk bag 16, via the bag spout 18, to the downstream components of the material handling and processing system 14. In some embodiments, the product discharge assembly 12 may include one or more massaging paddles (not shown) configured to massage the bulk bag 16 once connected to the product discharge assembly 12, so as to facilitate removal of the product from within the bulk bag 16. In some embodiments, for example, the massaging paddles may be positioned on top of the bulk bag closing system 10, such that the massaging paddles can make contact with a body of the bulk bag 16 to perform massaging operations, which aid in the removal of product from the bulk bag 16.

FIGS. 2 and 3 show the bulk bag closing system 10 in more detail in relation with the bulk bag 16. FIG. 2 illustrates the bag spout 18 of the bulk bag 16 extending through the bulk bag closing system 10 and into engagement with the product discharge assembly 12. The bulk bag closing system 10 of FIG. 2 is in an open configuration, so as to not constrict around the bag spout 18, thereby permitting product to flow generally freely from the bulk bag 16 and into the product discharge assembly 12. In contrast, FIG. 3 illustrates the bulk bag closing system 10 in a closed configuration, so as to constrict around the bag spout 18, thereby restricting or completely preventing product from flowing from the bulk bag 16.

Figure 4:
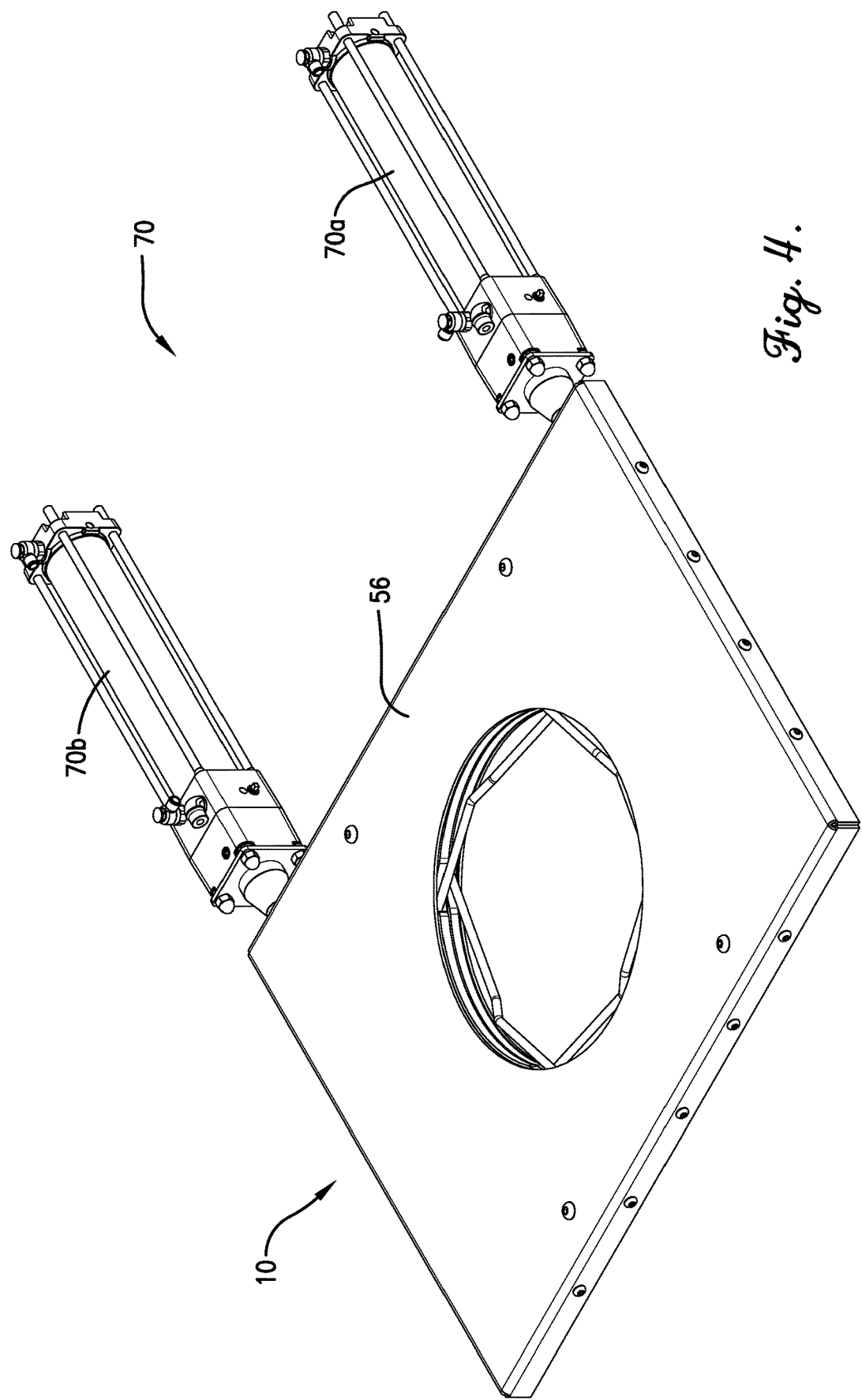
FIG. 4 is a perspective view of the bulk bag closing system from FIGS. 1-3.
Figure 5:
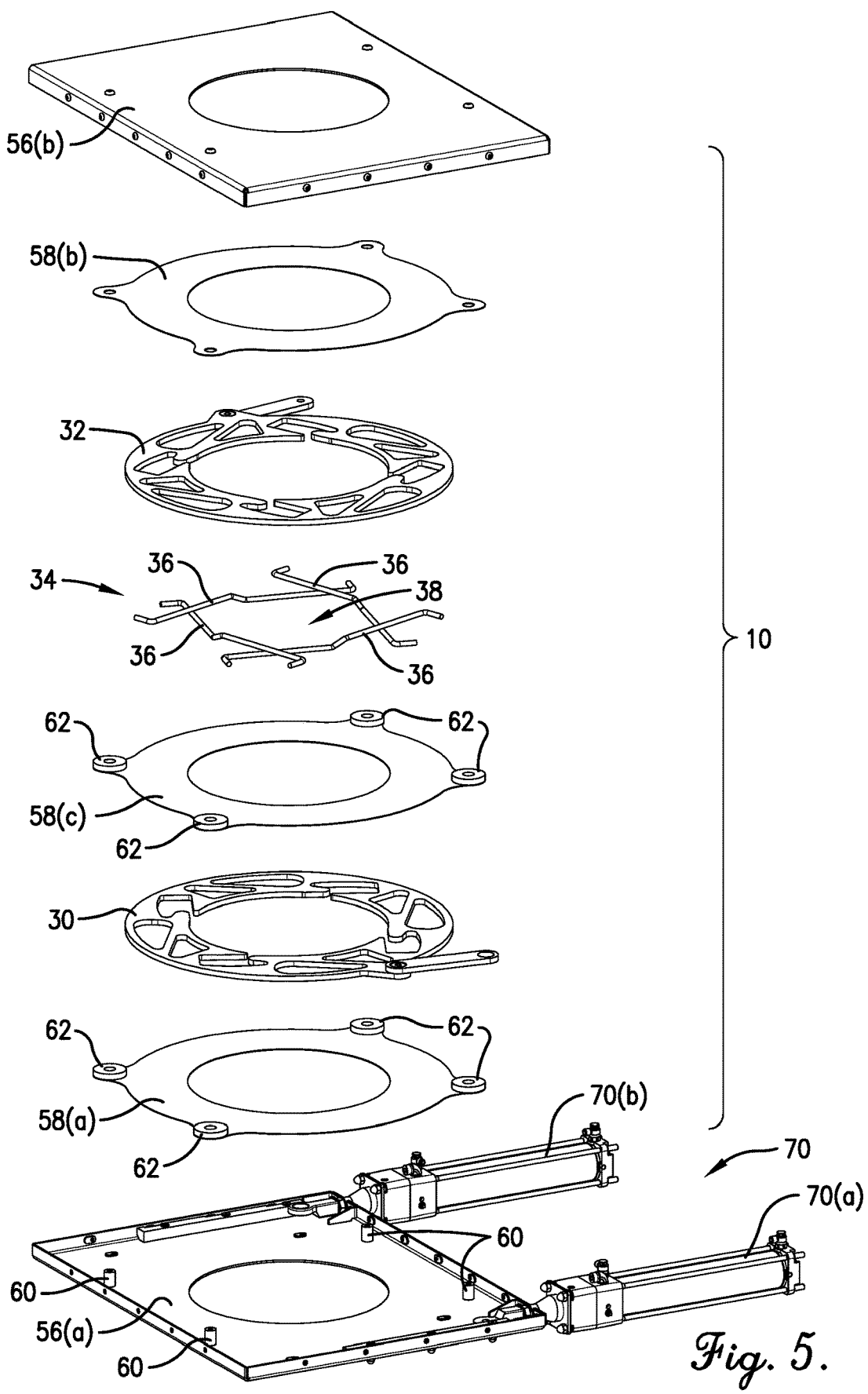
FIG. 5 is an exploded view of the bulk bag closing system from FIG. 4.

Turning to FIGS. 4 and 5, the bulk bag closing system 10 is shown in further detail. As perhaps best shown in FIG. 5, the bulk bag closing system 10 may comprise a plate assembly that includes a first rotatable plate 30 and a second rotatable plate 32. In some embodiments, the first plate 30 will be a bottom plate that is generally positioned below the second plate 32, which is a top plate. The bulk bag closing system 10 may additionally comprise a constriction assembly 34 that includes a plurality of constriction rods 36 or rods, each being configured to extend between the first plate 30 and the second plate 32, as illustrated in FIGS. 5-11. As such, the constriction assembly 34 presents, creates, and/or encloses, via the arrangement of the individual constriction rods 36, a constriction area 38 that is configured to receive a portion (e.g., the bag spout 18) of the bulk bag 16. As will be described in more detail below, both of the plates 30, 32 can be independently rotated so as to shift the constriction assembly 34 between an open position and a closed position, and vice-versa.

Figure 6:
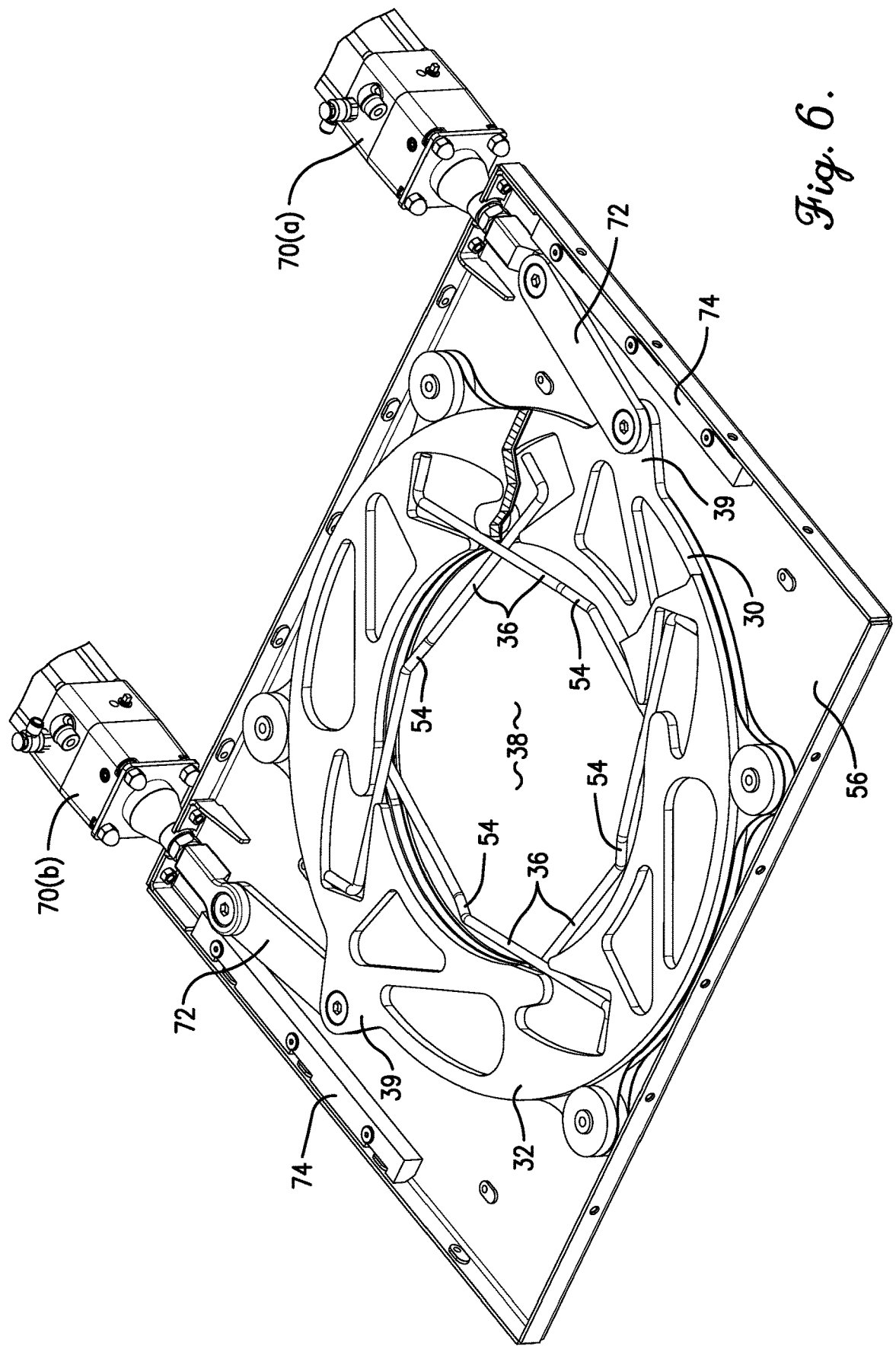
FIG. 6 is a perspective view of the bulk bag closing system from FIG. 4, with an upper portion of a housing of the bulk bag closing system removed so as to illustrate a first plate, a second plate, and a constriction assembly in an open position.
Figure 7:
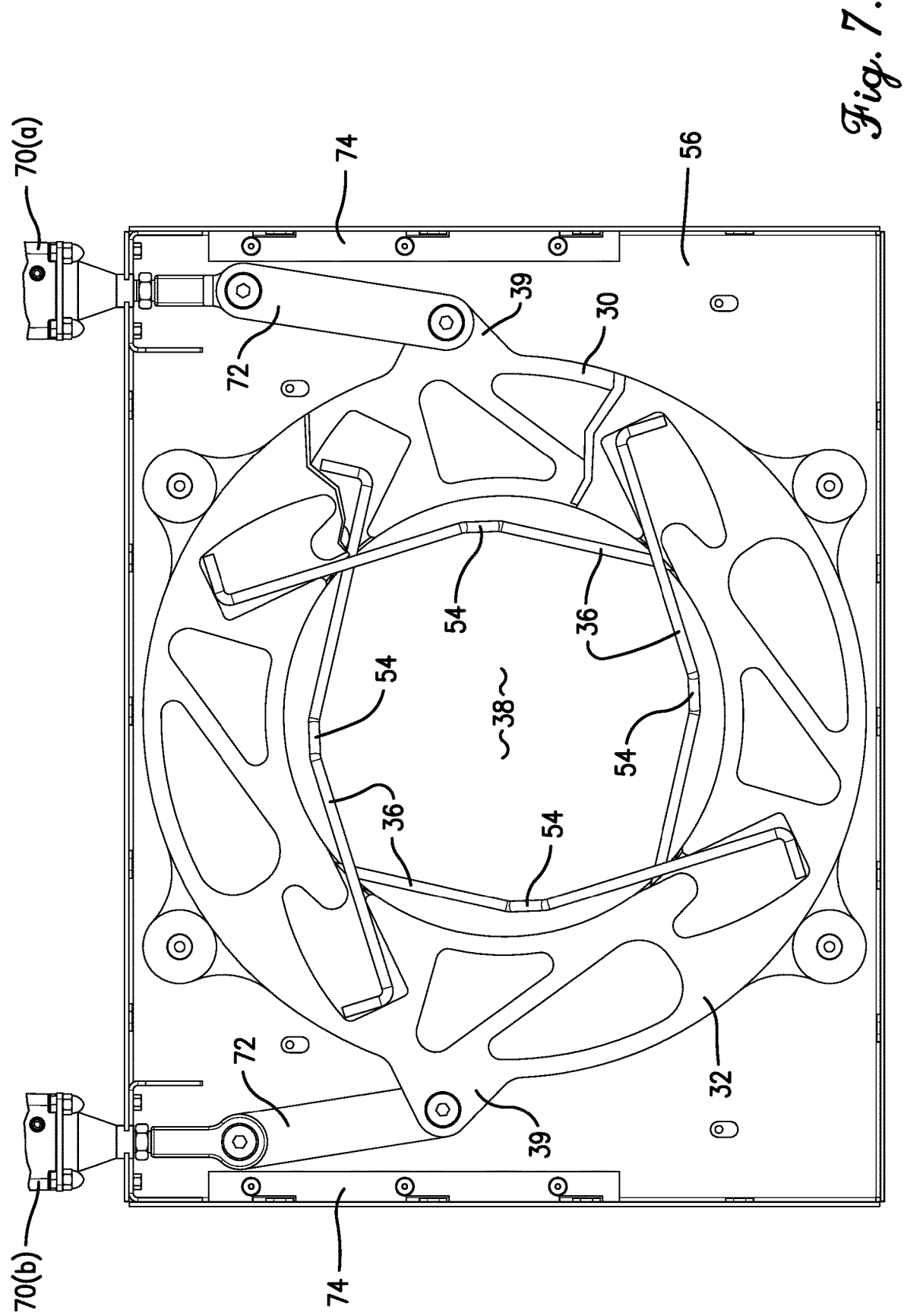
FIG. 7 is a top plan view of the bulk bag closing system from FIG. 6.
Figure 8:
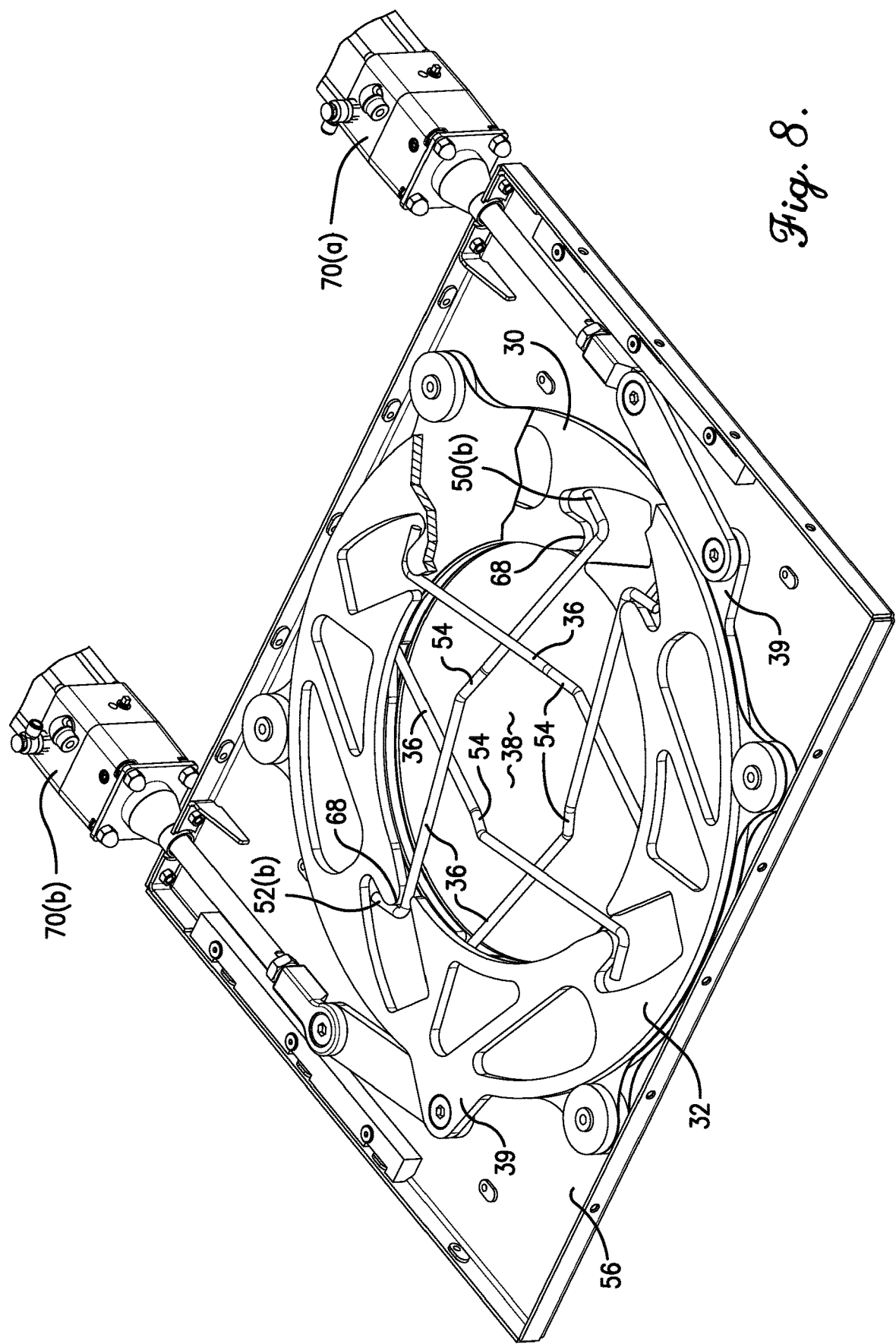
FIG. 8 is a perspective view of the bulk bag closing system from FIG. 4, with an upper portion of a housing of the bulk bag closing system removed so as to illustrate a first plate, a second plate, and a constriction assembly intermediate an open position and a closed position.
Figure 9:
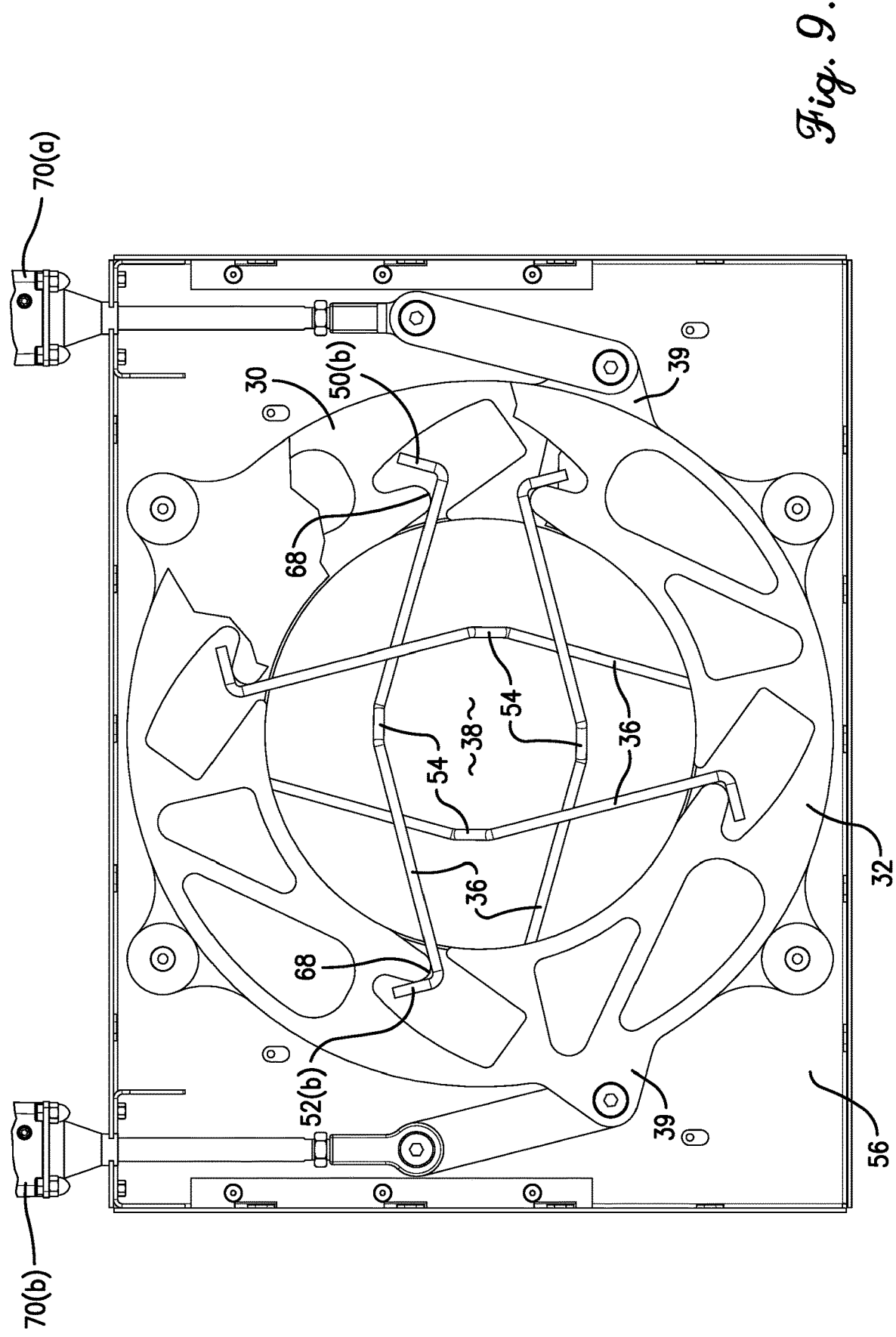
FIG. 9 is a top plan view of the bulk bag closing system from FIG. 8.
Figure 10:
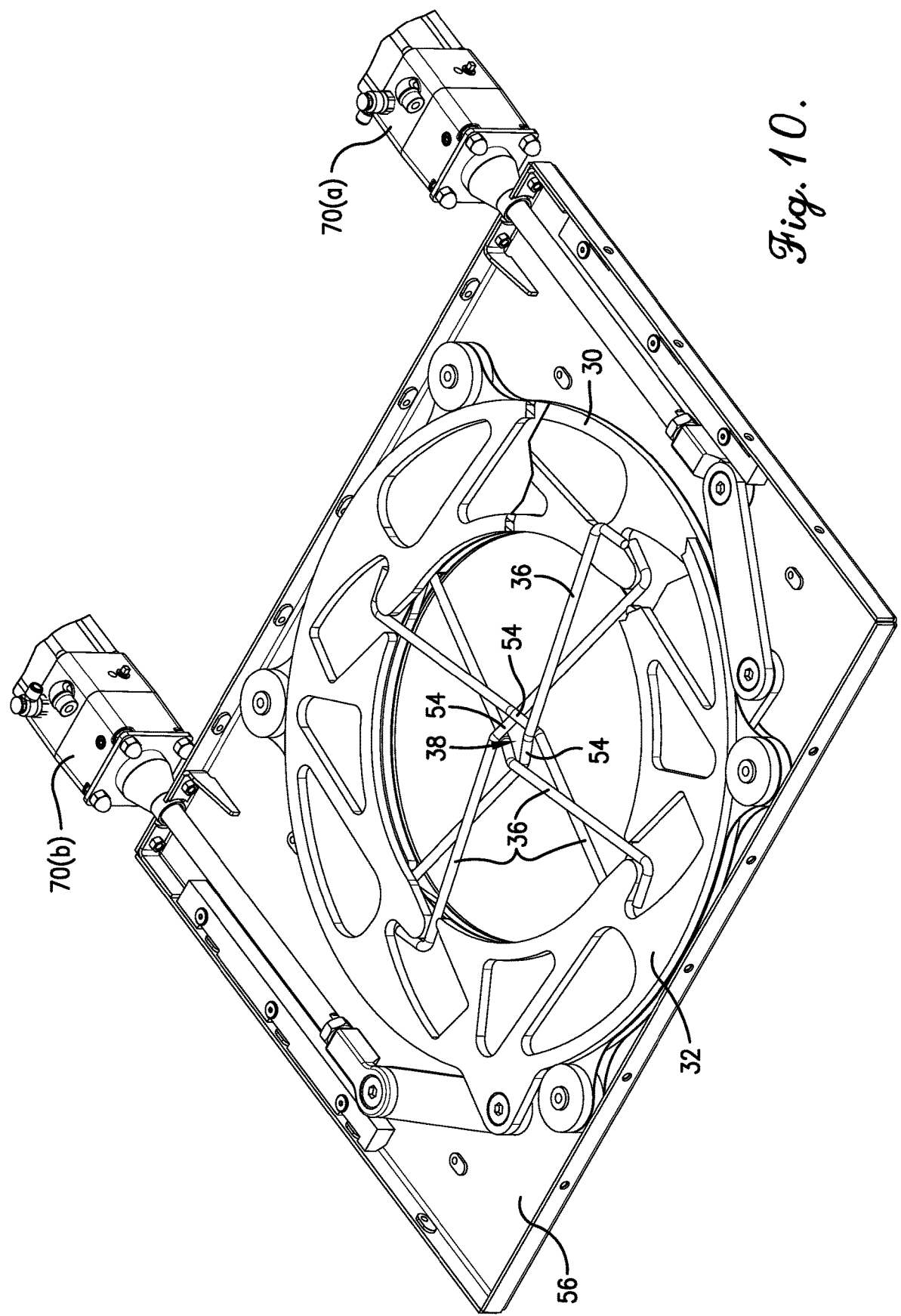
FIG. 10 is a perspective view of the bulk bag closing system from FIG. 4, with an upper portion of a housing of the bulk bag closing system removed so as to illustrate a first plate, a second plate, and a constriction assembly in a closed position.
Figure 11:
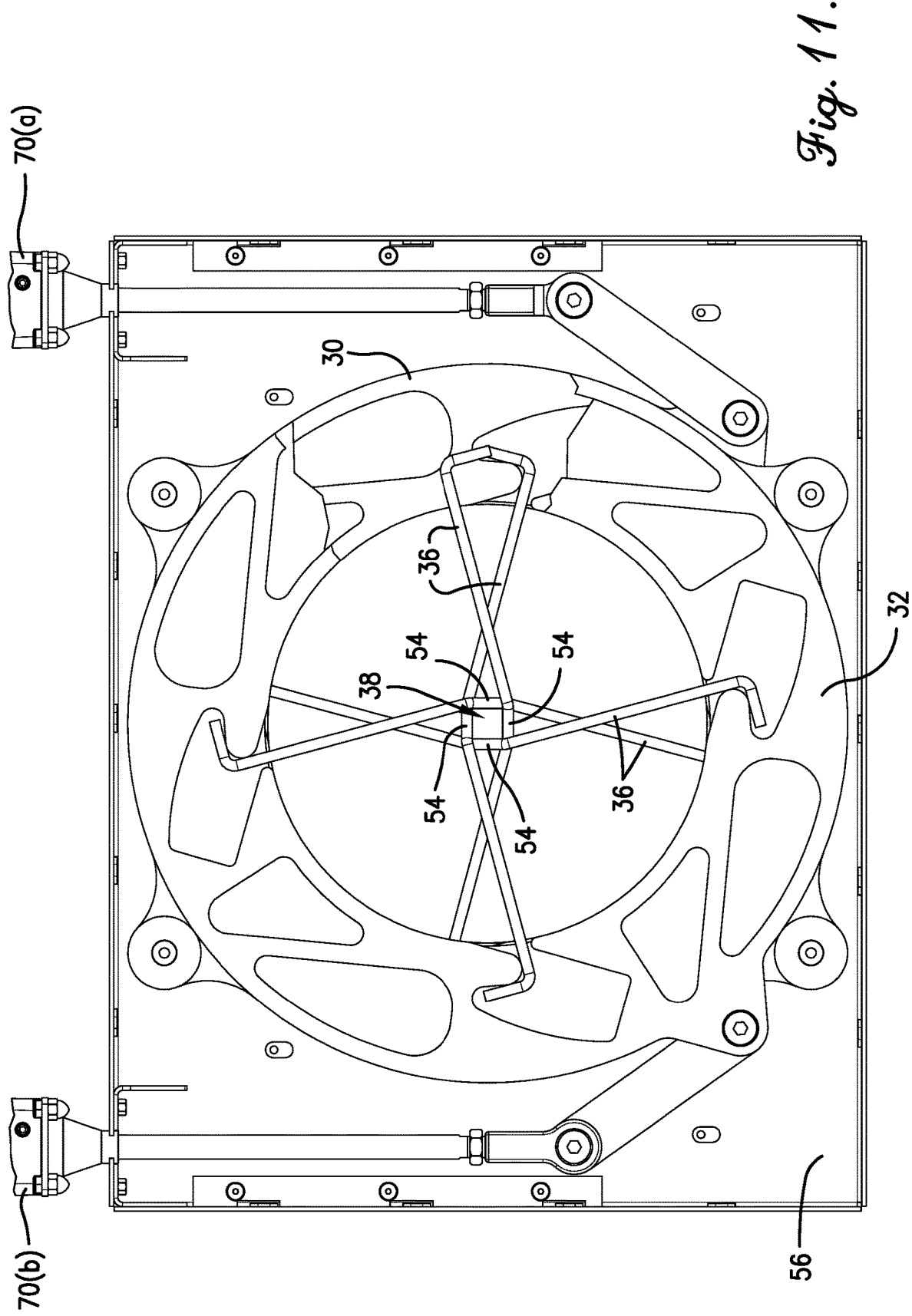
FIG. 11 is a top plan view of the bulk bag closing system from FIG. 10.

With the constriction assembly 34 in the open position, as shown in FIGS. 6 and 7, the constriction area 38 is generally at a maximum size, such that the bag spout 18 is not constricted by the constriction rods 36 and product can flow freely from the bulk bag 16 through the bag spout 18. In contrast, when the constriction assembly 34 is in the closed position, as shown in FIGS. 10 and 11, the constriction area 38 is generally at a minimum size (i.e., smaller than and/or reduced from the maximum size), such that the bag spout 18 is constricted by the constriction rods 36, so as to restrict or prevent product flow from the bulk bag 16 through the bag spout 18. FIGS. 8 and 9 show the constriction assembly 34 in an intermediate position (i.e., between the closed position and the open position). Such an intermediate position may be obtained as the constriction assembly 34 is transitioning between the closed position to the open position or between the open position to the closed position.

Figure 12:
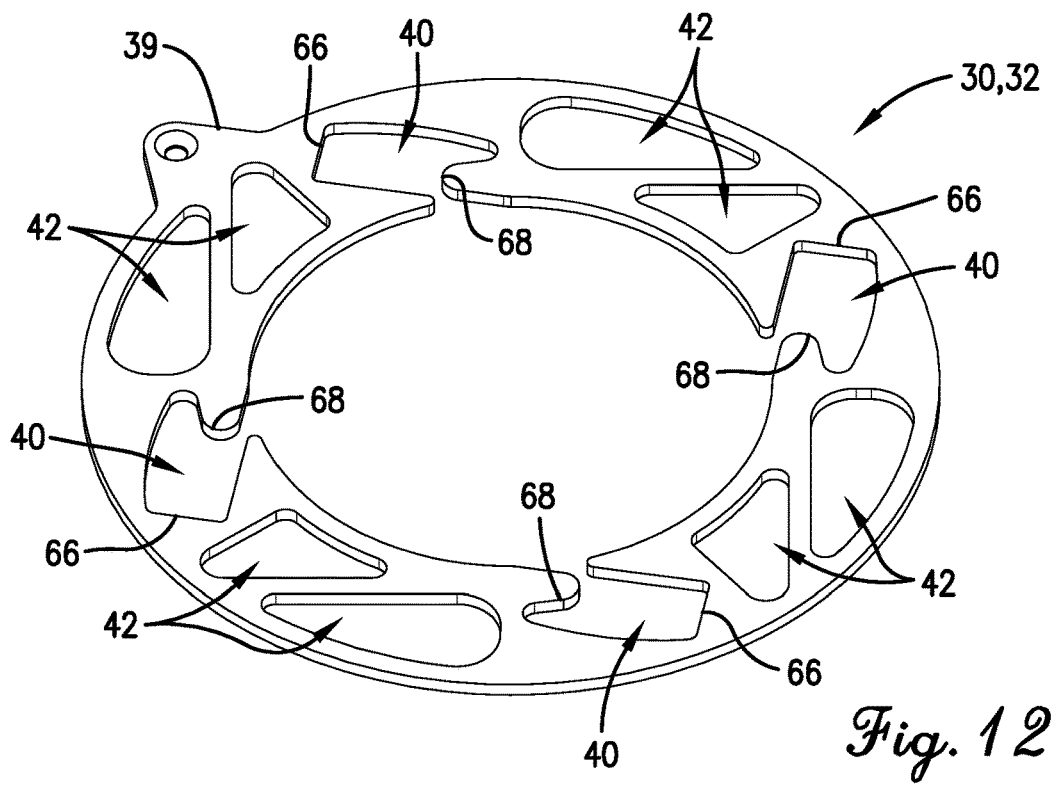
FIG. 12 is a perspective view of a rotatable plate from the bulk bag closing system of FIG. 4.
Figure 13:
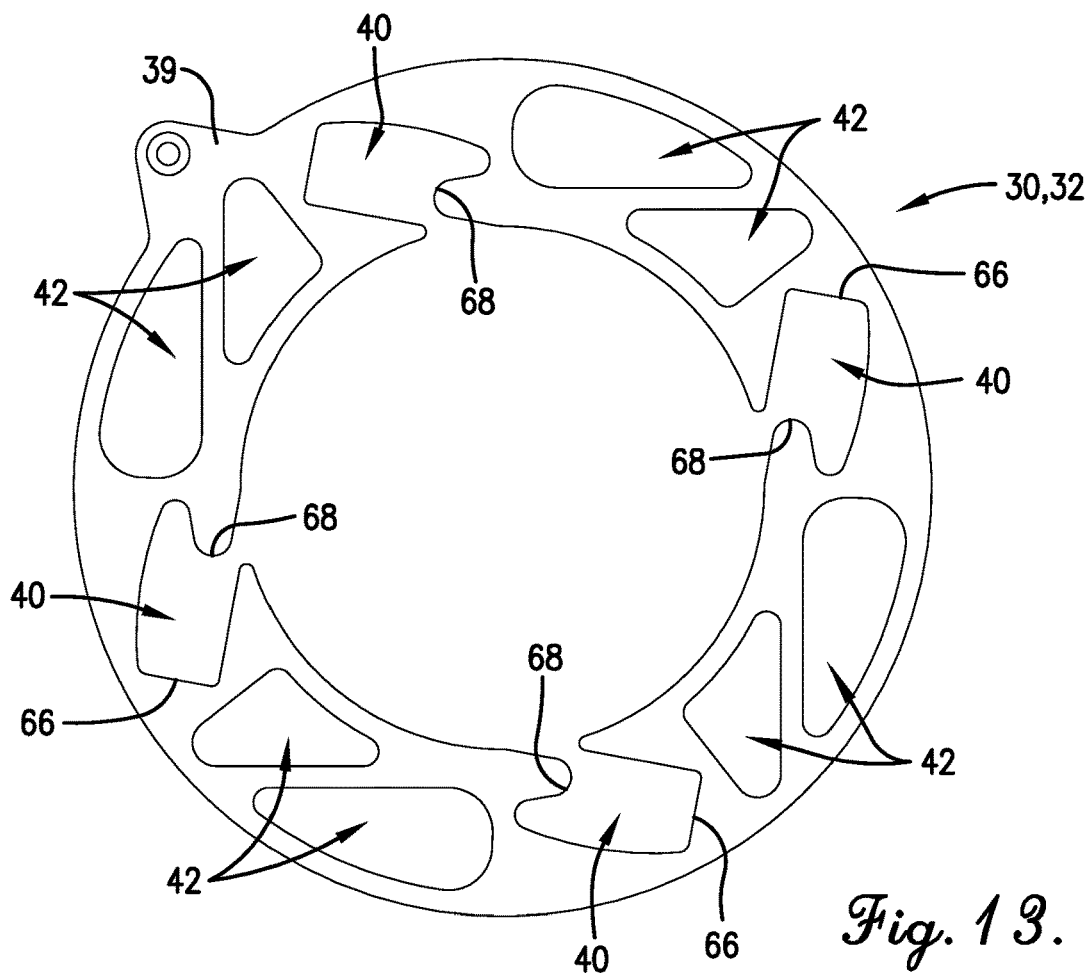
FIG. 13 is a top plan view of the rotatable plate from FIG. 12.

Turning to the plates 30, 32 in more detail, an exemplary plate is illustrated in FIGS. 12 and 13. In some embodiments, the plates 30, 32 may be generally configured the same. In more detail, the plates 30, 32 may comprise a circular or annular disc of metal (e.g., steel) with an inner diameter and an outer diameter. For example, in some embodiments the plates 30, 32 may have an inner diameter of between 12 and 30 inches, between 16 and 26 inches, or about 18 inches. As such, the plates 30, 32 may each present a central aperture with a size the generally corresponds with the inner diameter of the plate 30, 32. Additionally, in some embodiments, the plates 30, 32 may have an outer diameter of between 20 and 40 inches, between 25 and 35 inches, or about 30 inches. The plates 30, 32 may additionally be formed with a thickness of between 0.25 and 1 inches, between 0.33 and 0.66 inches, or about 0.5 inches. As illustrated, each of the plates 30, 32 may be formed with a mount arm 39 that extends radially outward from an outer/circumferential edge of the plates 30, 32.

In addition, each of the plates 30, 32 may be formed with a plurality of receiving cavities 40 formed through the thickness of the plate 30, 32. As will be described in more detail below, the receiving cavities 40 may be configured to receive ends of the constriction rods 36. In general, each of the constriction rods 36 will extend from a receiving cavity 40 from the first plate 30 to a receiving cavity 40 on the second plate 32. The extension of the constriction rods 36 between the plates 30, 32 is illustrated in FIGS. 6-11. The extension of such constriction rods 36 will, thus, be through at least a portion of the central apertures presented by the plates 30, 32. As such, as illustrated by FIGS. 12 and 13, each receiving cavity 40 may include an opening at the inner edge of the respective plate 30, 32, such that the interior space of the receiving cavity 40 of a given plate 30, 32 is in communication with the central opening of the plate 30, 32. Such a configuration permits the constriction rods 36 to extend into and/or out of a receiving cavity 40 of the first plate 30, through the central apertures of the plates 30, 32, and into a receiving cavity 40 of the second plate 32. In some embodiments, each of the plates 30, 32 may include the same number of receiving cavities 40 as the number of constriction rods 36 included within the constriction assembly 34. For example, as illustrated in the drawings, some embodiments provide for the constriction assembly 34 to include four constriction rods 36. As such, in some embodiments, the plates 30, 32 may each be formed with four receiving cavities 40. However, in other embodiments, the bulk bag closing system 10 may include other numbers of constriction rods 36, such as two, three, five, or more. In such embodiments, the plates 30, 32 may each include a corresponding two, three, five, or more receiving cavities 40.

In some additional embodiments, each the plates 30, 32 may additionally include one or more minor apertures or cutouts 42 formed through the thickness of the plate 30, 32. In some embodiments, the cutouts 42 may be used to reduce the weight of the plates 30, 32. The cutouts 42 may be configured in different sizes and shapes, which reduce the weight of the plates 30, 32, but which provide for the plates 30, 32 to maintain sufficient strength and durability during operation of the bulk bag closing system 10.

Figure 14:
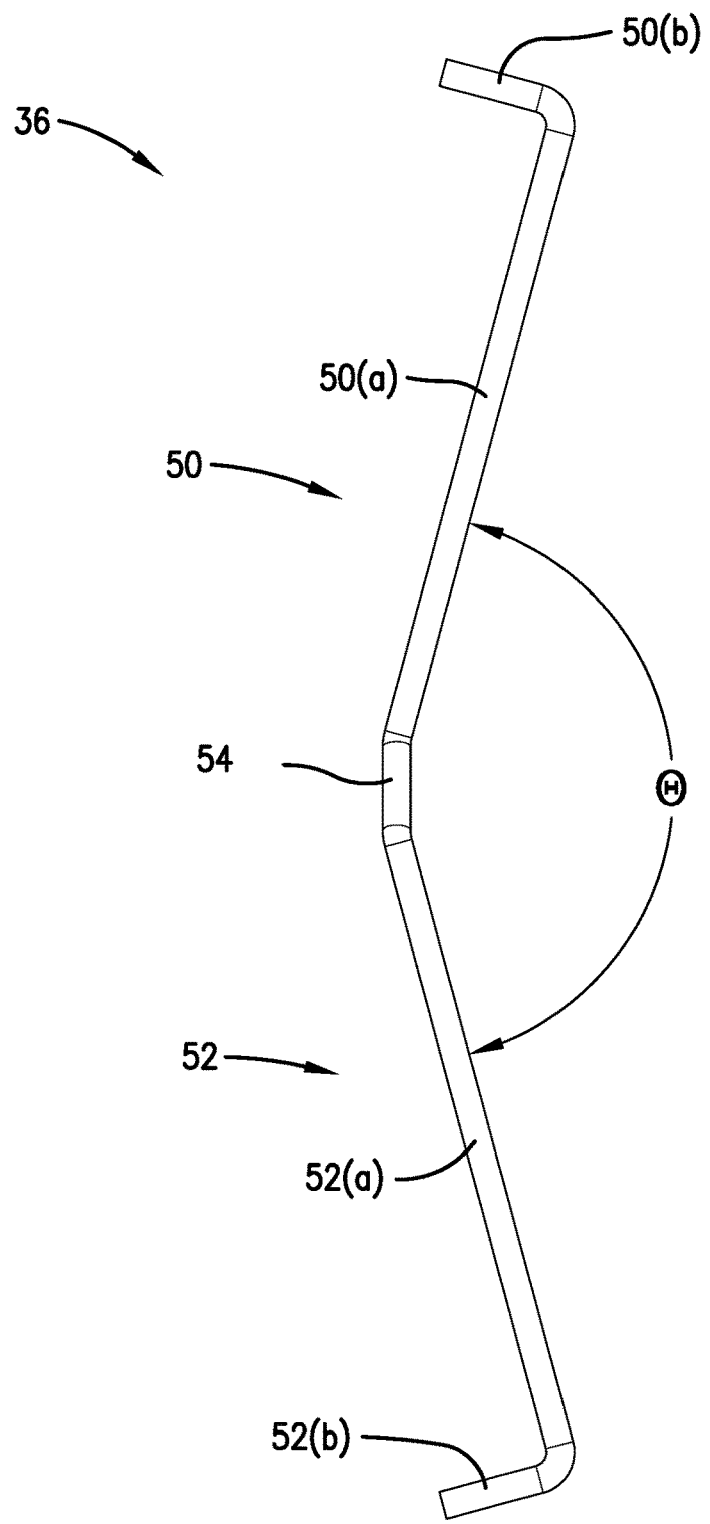
FIG. 14 is a top plan view of a constriction rod included as part of a constriction assembly from the bulk bag closing system of FIG. 4.

An exemplary constriction rod 36 is illustrated in more detail in FIG. 14. In some embodiments, the constriction rods 36 may comprise rods or shafts formed from metal (e.g., steel) round bar or round stock. In other embodiments, the constriction rods may be formed from another material with high strength and durability. Regardless, the constriction rods 36 will generally be rigid, so as to facilitate a secure closing force against the bag spout 18 of the bulk bag 16 when the constriction assembly 34 is configured in the closed position, as will be described in more detail below. The constriction rods 36 may each comprise a first section 50 connected to a second section 52 via a central section 54. In some embodiments, each of the first and second sections 50, 52 (or portions thereof) may include a main portion 50(a), 52(a) that extends from the central section 54 to a respective outer end of the first or second section 50, 52. The first and second sections 50, 52 may each additionally include a projection or a leg 50(b), 52(b) that extends from the respective main portion 50(a), 52(a) at the outer end of the first or second section 50, 52. In some embodiments, the main portions 50(a), 52(a) of the first and second sections 50, 52 extend generally linearly from a vertex at the central section 54. In some embodiments, the main portions 50(a), 52(a) of the first and second sections 50, 52 may extend from each other at an angle $\Theta$ with the angle $\Theta$ being generally of vertex presented by the first and second sections 50, 52. The angle $\Theta$ may be an obtuse angle between 90 and 180 degrees, between 110 and 165 degrees, or about 150 degrees. Furthermore, the legs 50(b), 52(b) that extends from the respective main portions 50(a), 52(a) may extend in a direction generally opposite of the angle $\Theta$ presented by the vertex of the main portions 50(a), 52(a) of the first and second sections 50, 52.

As will be described in more detail below, each of the constriction rods 36 that form the constriction assembly 34 may be engaged with the first and second plates 30, 32 in a manner that permits one end of each constriction rod 36 to be received in one of the receiving cavities 40 of the first plate 30 and the other end of the constriction rod 36 to be received in one of the receiving cavities of the second plate 32. As such, each constriction rod 36 may be simultaneously engaged with both plates 30, 32.

As shown in FIG. 4, the bulk bag closing system 10 may include a housing 56 in which the first and second plates 30, 32, as well as at least portions of the constriction assembly 34, are positioned. The housing 56 may be generally rectangular having a size sufficient to receive the first and second plates 30, 32, as well as at least portions of the constriction assembly 34. In some embodiments, the housing 56 may be formed with a thickness of between 0.5 and 5 inches, between 1 and 4 inches, between 1.5 and 3 inches, or about 1.75 inches or about 2.0 inches. As such, in some embodiments, an overall thickness of the bulk bag closing system 10 may have a thickness of between 0.5 and 5 inches, between 1 and 4 inches, between 1.5 and 3 inches, or about 1.75 inches or about 2.0 inches. The housing 56 may, as perhaps best illustrated in FIG. 5, include first portion 56(a) (e.g., a lower portion) and a second portion 56(b) (e.g., an upper portion) that can be secured together (e.g., via fasteners) to securely house certain of the internal components of the bulk bag closing system 10 (e.g., the plates 30, 32 and the constriction assembly 34). As illustrated in the drawings, the housing 56 (including the first and second portions 56(*a*), (*b*)) may be formed with a central aperture, which is aligned with the central apertures of the plates 30, 32, such that the overall bulk bag closing system 10 may be formed with central aperture through which the bag spout 18 of the bulk bag 16 can extend through. As a result, product flow can be selectively controlled by the bulk bag closing system 10 constricting the bag spout 18, as discussed in more detail below.

As noted previously, in some embodiments, the first plate 30 will be a lower plate and the second plate 32 will be an upper plate. As such, when the plates 30, 32 are positioned within the housing 56, the first plate 30 may be positioned adjacent to the first portion 56(*a*) (e.g., the lower portion), and the second plate 32 may be positioned adjacent to the second portion 56(*b*) (e.g., the upper portion). In addition, the constriction rods 36 of the constriction assembly 34 may be positioned so as to extend from the first plate 30 to the second plate 32. In some additional embodiments, however, a first spacer element 58(*a*) may be positioned between the first plate 30 and the first portion 56(*a*) of the housing 56. Similarly, a second spacer element 58(*b*) may be positioned between the second plate 32 and the second portion 56(*b*) of the housing 56. Furthermore, a third spacer element 58(*c*) may be positioned between the first and second plates 30, 32. The spacer elements 58(*a*), (*b*), (*c*) may be formed generally as thin, annular discs with inner and outer diameters that match those of the plates 30, 32. As such, the spacer elements 58(*a*), (*b*), (*c*) can be formed with central apertures that align with the central apertures of the plates 30, 32 and the housing 56, such that the bag spout 18 can extend through the housing 56, including through the plates 30, 32 and the spacer elements 58(*a*), (*b*), (*c*) housed therein. Certain embodiments provide for the spacer elements 58(*a*), (*b*), (*c*) to be formed from a material that is sufficiently rigid and durable to support the plates 30, 32, but which is impact-resistance, abrasion-resistant, and low fiction so as to allow the plates 30, 32 to efficiently rotate within the housing 56. For instance, in some embodiments, the spacer elements 58(*a*), (*b*), (*c*) may be formed from ultra-high molecular weight polyethylene (UHMW).

In some embodiments, certain of the internal components of the bulk bag closing system 10 may be held properly in place within the housing 56 via a plurality of guide rods 60, as illustrated in FIG. 5. For example, the bulk bag closing system 10 may include four guide rods 60 extending upward from the first portions 56(*a*) of the housing 56. The guide rods 60 may be positioned adjacent to each of the four corners of the housing 56. The spacer elements 58(*a*), (*b*), (*c*) may each include four mount arms extending radially from outer edges of the spacer elements 58(*a*), (*b*), (*c*). Such mount arms may include openings configured to receive the guide rods 60. As such, each of the spacer elements 58(*a*), (*b*), (*c*) may be securely mounted to the housing 56 by being positioned over the guide rods 60. For example, the first spacer element 58(*a*) may be placed over the guide rods 60 and positioned on top of the interior surface of the first portion 56(*a*) of the housing 56. The first plate 30 may then be positioned on top the first spacer element 58(*a*). Next, the third spacer element 58(*c*) may be placed over the guide rods 60 and positioned on top of the first plate 30. Next, the second plate 32 may be positioned on top the third spacer element 58(*c*). In some embodiments, the constriction rods 36 of the constriction assembly 34 may be engaged between the first plate 30 and the second plate 32 before or simultaneously with the second plate 32 being positioned on top the third spacer element 58(*c*). Next, the second spacer element 58(*b*) may be placed over the guide rods 60 and positioned on top of the second plate 32. Finally, the second portion 56(*b*) (i.e., the upper portion) of the housing 56 may be positioned on top of the second spacer element 58(*b*) and secured in place with the first portion 56(*a*) (i.e., the lower portion) of the housing 56 by fasteners extending through the second portion 56(*b*) of the housing 56 and into the guide rods 60.

In some embodiments, the bulk bag closing system 10 may include a plurality of idler rollers 62, as illustrated in FIG. 5, which are configured to facilitate rotation of the plates 30, 32 (with such rotation being described in more detail below), but which prevent lateral translation of the plates 30, 32 within and/or with respect to the housing 56. In more detail, the idler rollers may be configured as bushings that can be positioned over the guide rods 60. For example, in some embodiments, once the first spacer element 58(*a*) has been positioned over the guide rods 60 and adjacent to the first portion 56(*a*) of the housing 56, an idler roller 62 may be positioned on each of the four guide rods 60 on top of the first spacer element 58(*a*). As such, when the first plate 30 is positioned on top of the first spacer element 58(*a*), the outer or circumferential edge of the first plate 30 can make contact with four idler rollers 62, such that the idler rollers 62 permit rotation of the first plate 30 but inhibit lateral translation of the first plate 30 with respect to the housing 56.

Similarly, once the third spacer element 58(*c*) has been positioned over the guide rods 60 and on top of the first plate 30, an idler roller 62 may be positioned on each of the four guide rods 60 on top of the third spacer element 58(*c*). As such, when the second plate 32 is positioned on top of the third spacer element 58(*c*), the outer or circumferential edge of the second plate 32 can make contact with the four idler rollers 62, such that the idler rollers 62 permit rotation of the second plate 32 but inhibit lateral translation of the second plate 32 with respect to the housing 56. In some embodiments, the idler rollers 62 may also be formed from UHMW polyethylene, so as to be sufficiently rigid and durable, but also impact-resistance, abrasion-resistant, and having low fiction.

Upon the plates 30, 32 and the constriction assembly 34 being positioned within the housing 56, the plates 30, 32 can be actuated/rotated so as to shift the constriction assembly 34 between the open position (See FIGS. 5 and 6) and the closed position (See FIGS. 9 and 10). To facilitate rotation of the plates 30, 32, the bulk bag closing system 10 may include an actuating mechanism 70, as illustrated in FIGS. 4 and 5. The actuating mechanism 70 may comprise a pair of actuators (e.g., a first actuator 70(*a*) and a second actuator 70(*b*)), which may be in the form of linear actuators, with each actuator 70(*a*), (*b*) being configured to rotate one of the first plate 30 and the second plate 32. As such, the plates 30, 32 can be independently rotated by the actuating mechanism 70. In some embodiments, the actuators 70(*a*), (*b*) may each comprise a pneumatic cylinder. However, in other embodiments, the actuators 70(*a*), (*b*) may comprise hydraulic or electric cylinders. In still further embodiments, the actuating mechanism 70 may comprise one or more rotatable actuators, such as a motor (e.g., an electric motor) configured to rotate the plates 30, 32 via a geared connection.

In some embodiments, the actuating mechanism 70 may be rigidly secured to the housing 56. In other embodiments, each of the housing 56 and/or the actuating mechanism 70 may be rigidly secured to the unloader frame 20 (e.g., above the product discharge assembly 12). As shown in FIGS. 6 and 7, the first actuator 70(a) may be connected to the first plate 30 via a connection element 72 that extends between an end of a piston of the first actuator 70(a) and the mount arm 39 of the first plate 30. The connection element 72 may be rotatably connected to each of the mount arm 39 and the piston of the first actuator 70(a), such that extension/retraction of the piston of the first actuator 70(a) will impart a rotation to the first plate 30 via the connection element 72. In some embodiments, a guide bar 74 may be secured to the housing 56 adjacent to the connection element 72, so as to guide and support the connection element 72 during extension/retraction of the piston of the first actuator 70(a). The guide bar 74 may be formed from UHMW polyethylene, so as to be sufficiently rigid and durable, but also impact-resistance, abrasion-resistant, and having low fiction.

Similarly, the second actuator 70(b) may be connected to the second plate 32 via a connection element 72 that extends between an end of a piston of the second actuator 70(b) and the mount arm 39 of the second plate 32. The connection element 72 may be rotatably connected to each of the mount arm 39 and the piston of the second actuator 70(b), such that extension/retraction of the piston of the second actuator 70(b) will impart a rotation to the second plate 32. In some embodiments, a guide bar 74 may be secured to the housing 56 adjacent to the connection element 72, so as to guide and support the connection element 72 during extension/retraction of the piston of the second actuator 70(b). The guide bar 74 may be formed from UHMW polyethylene, so as to be sufficiently rigid and durable, but also impact-resistance, abrasion-resistant, and having low fiction.

The bulk bag closing system 10 described above is configured to constrict around the bag spout 18 of a bulk bag 16 by rotating the first plate 30 and the second plate 32 so as to shift the constriction assembly 34 (which comprise the constriction rods 36) from an open position (See, e.g., FIGS. 6 and 7) to a closed position (See, e.g., FIGS. 10 and 11). For example, as illustrated in FIGS. 6 and 7, the first plate 30 may be positioned such that its mount arm 39 is positioned on a side of the housing 56 closer and/or adjacent to the first actuator 70(a), such that the first actuator 70(a) can actuate the first plate 30 via connection element 72. Similarly, the second plate 32 may be positioned such that its mount arm 39 is positioned on a side of the housing 56 closer and/or adjacent to the second actuator 70(b), such that the second actuator 70(b) can actuate the second plate 32 via connection element 72.

As discussed previously, each of the constriction rods 36 may be configured with one end positioned within a receiving cavity 40 of the first plate 30 and one end positioned within a receiving cavity 40 of the second plate 32. When the constriction assembly 34 is in the open position (See, e.g., FIGS. 6 and 7), the plates 30, 32 and the constriction rods 36 will be configured such that the central section 54 of each constriction rod 36 is positioned generally adjacent to the inner edges of the plates 30, 32. In such a configuration, the vertex of each constriction rod 36 (which presents the angle Θ) will generally face towards the central aperture presented by the bulk bag closing system 10 (i.e., the central aperture presented by the housing 56 and the plates 30, 32). To facilitate such orientation, the legs 50(b), 52(b) of each of the constriction rods 36 may be orientated outward, directed away from the central aperture presented by the bulk bag closing system 10 (See, e.g., FIGS. 6 and 7). In certain embodiment, the constriction rods 36 will extend in an interwoven fashion with respect to each other. For example, as shown in FIGS. 6-9, each constriction rod 36 will extend from the first plate 30, underneath an adjacent constriction rod 36, across a portion of the central aperture of the plates 30, 32, over another adjacent constriction rod 36, and into engagement with the second plate 32. Such an interwoven configuration permits the constriction rods 36 to constrict around the bag spout 18 of the bulk bag 16 with a sufficient amount of force to restrict or completely prevent product from flowing from the bulk bag 16. Additionally, such an interwoven configuration is beneficial for preventing the constriction rods 36 from self-interfering too quickly when shifting from a closed position to an open position, which could prevent the bag spout 18 from being sufficiently constricted to completely prevent the flow of product from the bulk bag 16.

It should be understood that, in some embodiments, the ends (including the legs 50(b), 52(b)) of the constriction rods 36 may not be rigidly or fixedly secured to the plates 30, 32. Instead, the ends of the constriction rods 36 may be received within the receiving cavities 40 of the plates 30, 32 in a manner that allows the ends of the constriction rods 36 to at least partly shift positions within the receiving cavities 40 of the plates 30, 32. Generally, when the constriction assembly 34 is in the open position, as shown in FIGS. 6 and 7, each leg 50(b), 52(b) of the constriction rods 36 will be positioned adjacent to a base side 66 of the given receiving cavity 40 in which the leg 50(b), 52(b) is positioned. The base side 66 of the receiving cavities 40 are shown in in more detail in FIGS. 12 and 13. Each of the receiving cavities 40 may additionally include a projecting side 68 positioned opposite the base side 66. Each projecting side 68 may include a projection element that extends inward into the receiving cavity 40. In some embodiments, the projection element that forms the projecting side 68 will be orientated in a direction that the respective plate 30, 32 rotates when shifting the constriction assembly 34 from an open position to a closed position, as will be discussed in more detail below.

To shift the constriction assembly from the open position (e.g., FIGS. 6 and 7) to the closed position (e.g., FIGS. 10 and 11), the actuators 70(a), (b) will respectively rotate the first and second plates 30, 32. Generally, the plates 30, 32 will be rotated in opposing direction. For example, when viewing the bulk bag closing system 10 from a top perspective (e.g., FIGS. 6 and 7), to shift the constriction assembly 34 from an open position to a closed position, the first actuator 70(a) will rotate the first plate 30 in a clockwise direction, while the second actuator 70(b) will rotate the scond plate 32 in a counter-clockwise direction. In some embodiments, the actuators 70(a), (b) will rotate the plates 30, 32 simultaneously. In other embodiments, one actuator 70(a), (b) will rotate one of the plates 30, 32 first, and then the other actuator 70(a), (b) will rotate the other of the plates 30,32 after the initial plate has been rotated.

FIGS. 8 and 9 illustrate the actuators 70(a), (b) in the process of rotating the plates 30, 32 so as to shift the constriction assembly 34 (comprised of the constriction rods 36) from the open position to the closed position. As such, the constriction area 38 is reduced in size from when the constriction assembly 34 was in the open position (e.g., FIGS. 6 and 7). In more detail, the first actuator 70(a) will extend so as to rotate the first plate 30 in a clockwise direction (when viewing from a top of the bulk bag closing system 10 as shown in FIGS. 8 and 9). As such, the projecting sides 68 of the receiving cavities 40 of the first plate 30 will make contact with the legs 50(b) on one of the ends of the constriction rods 36 positioned within the receiving cavities 40, so as to rotate the legs 50(b) and the associated ends of the constriction rods 36 in a similar clockwise manner. Similarly, the second actuator 70(b) will extend so as to rotate the second plate 32 in a counterclockwise direction (when viewing from a top of the bulk bag closing system 10 as shown in FIGS. 8 and 9). As such, the projecting sides 68 of the receiving cavities 40 of the second plate 32 will make contact with the legs 52(*b*) on the other of the ends of the constriction rods 36 positioned within the receiving cavities 40, so as to rotate the legs 52(*b*) and the associated ends of the constriction rods 36 in a similar counter-clockwise manner.

Such rotation of the plates 30, 32 will cause the constriction rods 36 to shift inward towards each other. Specifically, the central sections 54 of the constriction rods 36 will shift inwardly, away from the inner edges of the plates 30, 32 and closer towards each other, such that the constriction area 38 is reduced. It is noted that the vertices of each constriction rod 36 (which present the angle Θ) continue to face inwardly, such that the constriction rods 36 are configured to surround and enclose around the bag spout 18 of the bulk bag 16 (not shown in FIGS. 7-11) when a bulk bag 16 has been inserted within the central aperture of the bulk bag closing system 10. It is noted that when in the intermediate position of FIGS. 8 and 9, the constriction rods 36 may remain interwoven with respect to each other in the manner discussed above. Specifically, each constriction rod 36 may extend from the first plate 30, underneath an adjacent constriction rod 36, across a portion of the central aperture of the plates 30, 32, over another adjacent constriction rod 36, and into engagement with the second plate 32.

The actuation of the actuators 70(*a*), (*b*) will continue to rotate the plates 30, 32 in the manner described above until the constriction assembly 34 (which comprises the constriction rods 36) has been shifted to the closed position, as illustrated in FIGS. 10 and 11. Specifically, the first actuator 70(*a*) will continue to rotate the first plate 30 in a clockwise direction, and the second actuator 70(*b*) will continue to rotate the second plate 32 in a counter-clockwise direction, until the constriction assembly 34 (which includes each of the constriction rods 36) has shifted to the closed position in which the constriction area 38 has been reduced to a minimum size. In more detail, in the closed position, the constriction rods 36 are positioned such that their central sections 54 are positioned their furthest extent away from the inner edges of the plates 30, 32 and are generally adjacent to each other so as to provide for the constriction area 38 to have the reduced sized. In such a configuration, the bulk bag closing system 10 is configured to constrict around the bag spout 18 of the bulk bag 16 so as to restrict or prevent the flow of product from the bulk bag 16. It is noted that when the constriction assembly 34 is in the closed position, the constriction rods 36 will continue to be interwoven with respect to each other. However, due to the significant rotations made by the plates 30, 32, the constriction rods 36 may each be woven (e.g., above or below) multiple and/or each of the other constriction rods 36 in the constriction assembly 34. In some embodiments, one or more of the constriction rods 36 may be woven (e.g., above or below) with respect to a given constriction rod 36 more than once. For example, as shown in FIGS. 10 and 11, each constriction rod 36 may extend from the first plate 30, underneath a first additional constriction rod 36, underneath a second additional constriction rod 36, over a third additional constriction rod 36, over the first additional constriction rod 36, and into engagement with the second plate 32. As illustrated, such an interwoven configuration permits the constriction rods 36 to form a small constriction area 38 that can tightly constrict around the bag spout 18 of the bulk bag 16 with a sufficient amount of force to restrict or completely prevent product from flowing from the bulk bag 16.

An opposite procedure can be performed so as to shift the constriction assembly 34 from the closed position (e.g., FIGS. 10 and 11) to the open position (e.g., FIGS. 6 and 7). For example, the first actuator 70(*a*) can retract so as to rotate the first plate 30 in a counterclockwise direction, and the second actuator 70(*b*) can retract so as to rotate the second plate 32 in a clockwise direction. Such actuation will cause the constriction rods 36 to shift, such that their center sections 54 are positioned adjacent to the inner edges of the plates 30, 32. As a result, the constriction assembly 34 will again be configured in the open position, so as to not constrict around the bag spout 18 of the bulk bag 16, and product can flow freely from the bulk bag 16.

In view of the above, embodiments of the present invention may include a method of selectively restricting product flow from a bulk bag 16. One step of the method may include positioning part of the bulk bag 16 (e.g., the bag spout 18) through the bulk bag closing system 10. As described above, the bulk bag closing system 10 may comprises a first rotatable plate 30, a second rotatable plate 32, and a plurality of constriction rods 36 extending between portions of the plates 30, 32. The constriction rods 36 may present a constriction area 38 configured to receive the bag spout 18 of the bulk bag 16. An additional step of the method may include rotating the first plate 30 in a first direction. A further step of the method may include rotating the second plate 32 in a second direction. During such rotating steps, the constriction rods 36 will be shifted so as to reduce a size of the constriction area 38 around the bag spout 18 of the bulk bag 16 so as to restrict product flow from the bulk bag 16.

In additional embodiment, the method may further include the step of rotating the first plate 30 in the second direction, and rotating the second plate 32 in the first direction. During such rotating steps, the constriction rods 36 will be shifted so as to increase size of the constriction area 36 around the bag spout 18 of the bulk bag 16 so as to permit product flow from the bulk bag 16.

Beneficially, the use of the plates 30, 32 to actuate the constriction rods 36 permits the bulk bag closing system 10 to shift the constriction assembly 34 to the closed position with a high amount of force. In particular, because the actuating mechanism 70 is configured to impart a force near the outer edges of the plates 30, 32, the plates 30, 32 will experience a high torque that is imparted to the constriction rods 36 when constricting around the bag spout 18 of the bulk bag 16. Such a high torque allows the constriction rods 36 to tightly constrict around the bag spout 18 so as to restrict or prevent the flow of product from the bulk bag 16 even when the bulk bag 16 contains a significant amount of product (e.g., 1 ton or more).

As a further benefit, the use of plates 30, 32 to impart actuation to the constriction rods 36 allows the bulk bag closing system 10 to be manufactured with a reduced thickness. Such a reduction in thickness is also permitted by the interwoven configuration of the constriction rods 36 of the constriction assembly 34. As discussed above, in some embodiments, the bulk bag closing system 10 may be formed with a thickness of between 0.5 and 5 inches, between 1 and 4 inches, between 1.5 and 3 inches, or about 1.75 inches or about 2.0 inches. Such a reduction in thickness is beneficial in permitting the bulk bag closing system 10 to be incorporated with various types of product discharge assemblies and/or product handling and processing systems, which generally do not provide a significant amount of free space for additional mechanisms or equipment.

Although the invention has been described with reference to the preferred embodiment illustrated in the attached drawing figures, it is noted that equivalents may be employed and substitutions made herein without departing from the scope of the invention as recited in the claims.

What is claimed is:

1. A closing system for a bag, said closing system comprising:
    a first plate and a second plate; and
    a plurality of constriction rods extending between said first plate and said second plate, wherein said constriction rods enclose a constriction area, wherein the constriction area is configured to receive a portion of the bag,
    wherein each of said first plate and said second plate is configured to independently rotate, wherein rotation of said plates is configured to shift said constriction rods so as to reduce a size of the constriction area.

2. The closing system of claim 1, wherein each of said first plate and said second plate comprises an annular disc.

3. The closing system of claim 1, further comprising a first actuator configured to rotate said first plate in a first direction, and further comprising a second actuator configured to rotate said second plate in a second direction.

4. The closing system of claim 3, wherein said first actuator and said second actuator comprise linear actuators.

5. The closing system of claim 3, wherein said first actuator and said second actuator comprise pneumatically powered actuators.

6. The closing system of claim 1, further comprising a housing, and wherein said first plate and said second plate are positioned within said housing.

7. The closing system of claim 6, further comprising a plurality of idler rollers positioned within said housing, wherein said idler rollers are configured to permit rotation of said first plate and to restrict lateral translation of said first plate with respect to said housing.

8. The closing system of claim 6, further comprising a spacer element positioned between said first plate and said second plate.

9. The closing system of claim 8, further comprising a plurality of idler rollers positioned adjacent said spacer element, wherein said idler rollers are configured to permit rotation of at least one of said first plate and said second plate and to restrict lateral translation of said at least one of said first plate and said second plate with respect to said housing.

10. The closing system of claim 1, wherein each of said first plate and said second plate comprises a plurality receiving cavities, wherein said receiving cavities are configured to receive ends of said constriction rods.

11. The closing system of claim 1, wherein each of said constriction rods comprises a first section connected to a second section via a central section, and wherein said first section and said second section are orientated at an angle with respect to each other.

12. The closing system of claim 1, wherein the bag is a bulk bag and comprises a spout, and wherein the constriction area enclosed by the constriction rods is configured to receive the spout of the bulk bag.

13. The closing system of claim 12, wherein said constriction rods form a constriction assembly, wherein said closing system is configured to shift said constriction assembly between an open position and a closed position, wherein in the open position product can be released from the bulk bag, and wherein in the closed position product is restricted from being released from the bulk bag.

14. A closing system for a bag, said closing system comprising:
    a plate assembly comprising at least two rotatable plates, wherein said plate assembly presents a central aperture; and
    a plurality of constriction rods extending between portions of said plate assembly and across a portion of the central aperture, wherein said constriction rods present a constriction area, and wherein the constriction area is configured to receive part of the bag,
    wherein actuation of said plate assembly is configured to shift said constriction rods so as to reduce a size of the constriction area.

15. The closing system of claim 14, wherein each of said first plate and said second plate comprises an annular disc, wherein each of said first plate and said second plate comprises a plurality receiving cavities, wherein said receiving cavities are configured to receive ends of said constriction rods.

16. The closing system of claim 14, further comprising a first linear actuator configured to rotate said first plate, and further comprising a second linear actuator configured to rotate said second plate, wherein said first linear actuator and said second linear actuator comprise pneumatically powered actuators.

17. The closing system of claim 14,
    wherein the bag is a bulk bag and comprises a spout, and wherein the constriction area presented by the constriction rods is configured to receive the spout,
    wherein said constriction rods form a constriction assembly, wherein said closing system is configured to shift said constriction assembly between an open position and a closed position, wherein in the open position product can be released from the bulk bag, and wherein in the closed position product is restricted from being released from the bulk bag.

18. A method of restricting product flow from a bag, said method comprising the steps of:
    (a) positioning part of the bag through a closing system, wherein the closing system comprises at least a first rotatable plate, a second rotatable plate, and a plurality of constriction rods extending between portions of said plates, and wherein said constriction rods present a constriction area configured to receive the part of the bag;
    (b) rotating the first plate in a first direction; and
    (c) rotating the second plate in a second direction,
        wherein during said rotating of steps (b) and (c), the constriction rods are shifted to reduce a size of the constriction area around the part of the bag so as to restrict product flow from the bag.

19. The method of claim 18, further comprising the steps of:
    (d) rotating the first plate in the second direction; and
    (e) rotating the second plate in the first direction,
        wherein during said rotating of steps (d) and (e), the constriction rods are shifted to increase the size of the constriction area around the part of the bag so as to permit product flow from the bag.

20. The method of claim 18, wherein said rotating of steps (b) and (c) are performed by pneumatically powered linear actuators actuating the first plate and the second plate.

* * * * *